Oct. 6, 1970   A. L. COURTNEY ET AL   3,532,308
FILAMENT STRUCTURE
Filed June 4, 1968   3 Sheets-Sheet 2
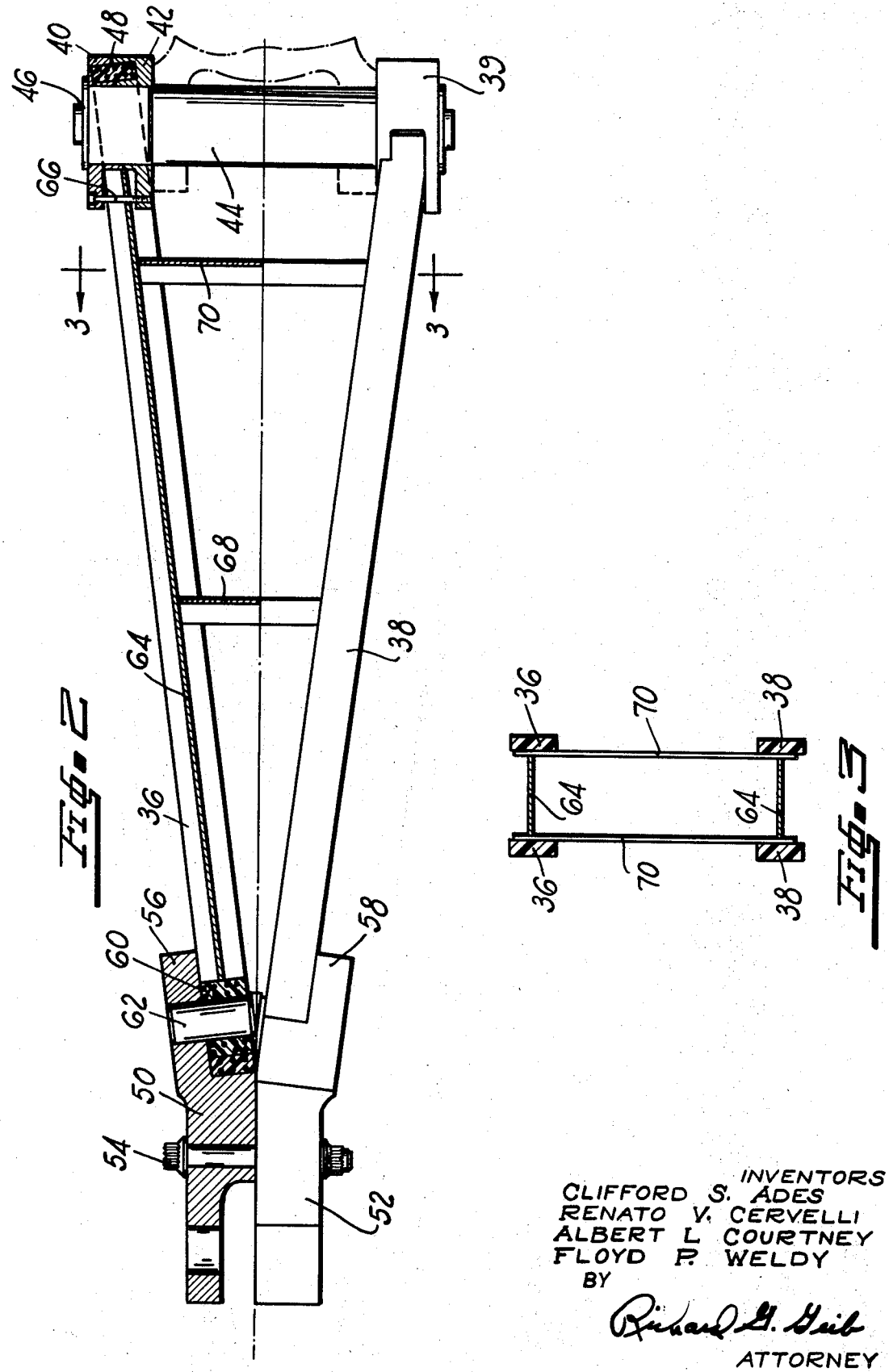
INVENTORS
CLIFFORD S. ADES
RENATO V. CERVELLI
ALBERT L. COURTNEY
FLOYD P. WELDY
BY
Richard G. Geib
ATTORNEY Oct. 6, 1970    A. L. COURTNEY ET AL    3,532,308
FILAMENT STRUCTURE Filed June 4, 1968    3 Sheets-Sheet 3

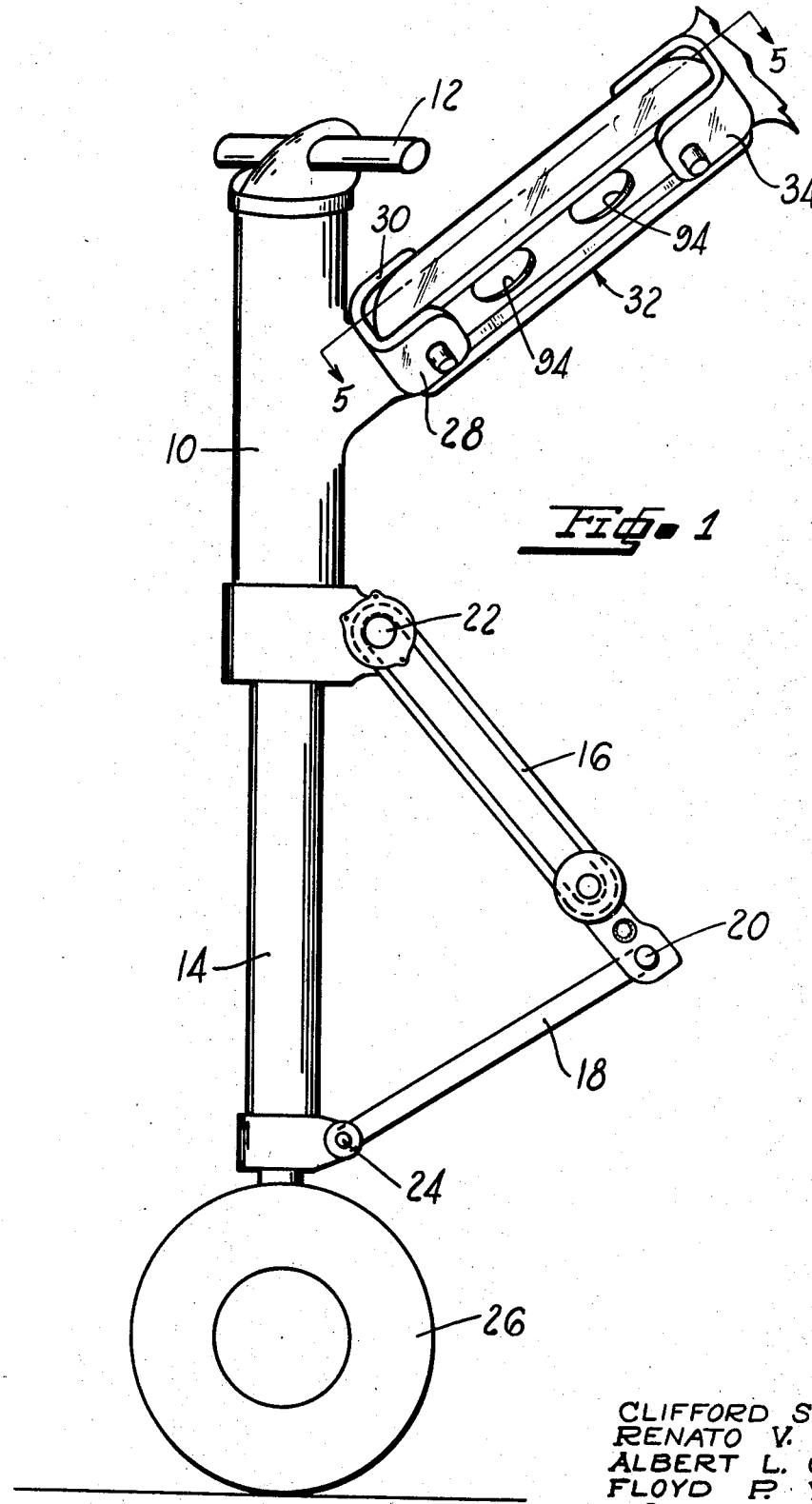

INVENTORS
CLIFFORD S. ADES
RENATO V. CERVELLI
ALBERT L. COURTNEY
FLOYD P. WELDY
BY
ATTORNEY

United States Patent Office 3,532,308
Patented Oct. 6, 1970

3,532,308
FILAMENT STRUCTURE
Albert L. Courtney, Floyd P. Weldy, Renato V. Cervelli, and Clifford S. Ades, South Bend, Ind., assignors to The Bendix Corporation, a corporation of Delaware
Filed June 4, 1968, Ser. No. 734,278
Int. Cl. B64c 25/64
U.S. Cl. 244—104    8 Claims

ABSTRACT OF THE DISCLOSURE

A composite load carrying structure having at least a loop of filament reinforced composite material integrated with bushing means adapted to join said composite to other members and carry loads therebetween or thereon.

SUMMARY

In recent years structural components found in aircraft landing gears and other mechanical assemblies provided an area of application for filament composite construction which has not been frequently explored. Because of the high intensity loads involved such components in the present state of the art consist of compact, thick walled structural elements. This invention is concerned with the construction of these elements by the filament winding and weaving process. In particular, this invention is concerned with utilizing wound adhesively integrated filaments with end fittings so as to provide structural elements of this and other types, as will be readily understood by those skilled in the art to which the invention relates.

DRAWING DESCRIPTION

FIG. 1 is a side view of an aircraft landing gear having a torque arm for a scissors link mechanism and a drag brace constructed in accordance with the principles of this invention;

FIG. 2 is a cross sectional plan view of the torque arm comprising the filament wound construction in accordance with the principles of this invention;

FIG. 3 is a view along lines 3—3 of FIG. 2 showing the filament loops and stiffener means in cross section;

DETAILED DESCRIPTION

Figure 4:
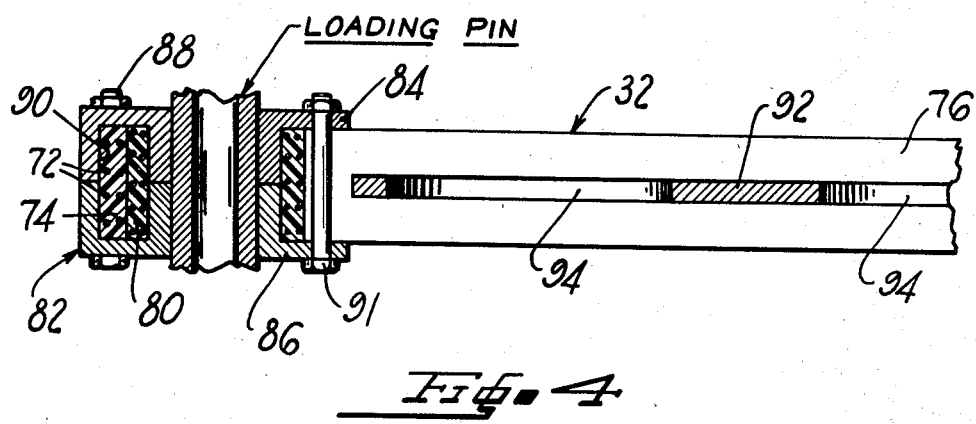
FIG. 4 is a fragmentary, cross-sectional view taken substantially along lines 4—4 of FIG. 5.

With reference now to FIG. 1 there is shown a shock absorber having a cylinder 10 affixed by a pin to aircraft structure (not shown) to be retractable therewithin. The cylinder has reciprocatorily mounted therewithin a piston 14, as will be readily understandable by those skilled in the art, which is also connected by a scissors link comprised of torque arms 16 and 18 pivotally joined together as at 20 and to the cylinder 10, as at 22 and the piston 14 as at 24. The piston 14 is provided with an axle (not shown) to which is mounted a wheel 26; whereas the cylinder 10 is provided with ears 28 and 30 within which a drag brace 32 is affixed at one end thereof with the other end affixed to surrounding aircraft structure 34.

The construction of the torque arms for the scissors link is shown in FIG. 2 to comprise a pair of loops 36 and 38 converging from one end fitting means at the one end to the other end fitting means at the other end. These end fitting means at the one end comprise a bushing having an upper half 40 and a lower half 42 which are joined on a transverse pin 44 by means of a fastener 46. The joining of these portions 40 and 42 enclose the loop 36 and/or 38 within a cavity 48 at an angle to the horizontal plane of the bushing 39.

At the other end a single end fitting is utilized comprising a portion 50 and a portion 52 bolted together as by bolt 54. Each of these portions have diverging flanges 56 and 58, respectively, to define a cavity for the receipt of the rounded ends of the loops 36 and 38. A collar or tube of filaments 60 is shown integrated with these rounded ends of the loops 36 and 38 in this area to snugly fit on the pin 62 whereby multi-directional loads may be transmitted by the fitting at this end. A stiffener means comprising webs 64 is within each of the loops 36 and 38 and bonded to the parallel sides of these loops. The webs 64 also may be bonded at the ends to the collars or tubes 60. A plurality of bolts 66 join the portions 40 and 42 of the end fittings 39 enclosing the ends of loops 36 or 38. If desired, transverse stiffeners 68 and 70 may be affixed to the web 64 to form a pair of box-like areas shown in FIG. 3.

Figure 5:
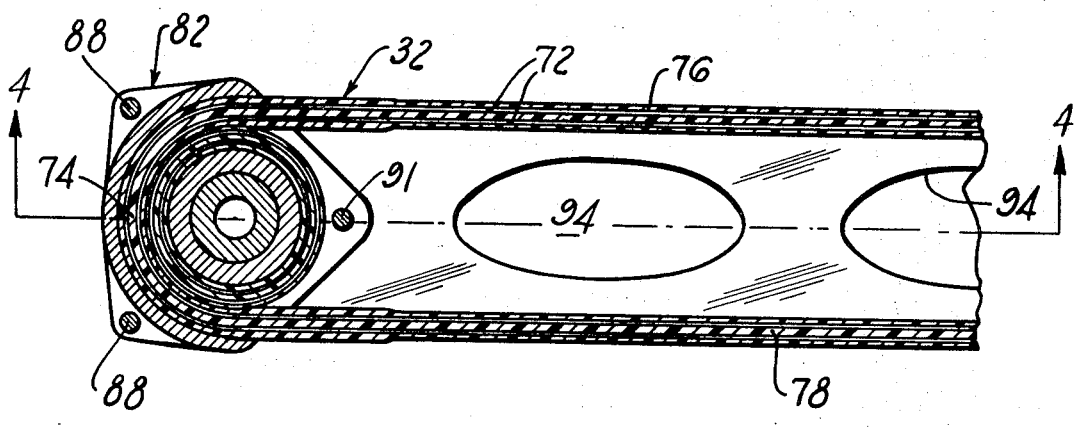
FIG. 5 is a fragmentary, cross-sectional view taken substantially along lines 5—5 of FIG. 1.

With regard now to the partial cross sections shown in FIGS. 4 and 5 of the drag brace 32, a loop of filaments 72 are made into a composite by an adhesive or suitable matrix to have a rounded end 74 with parallel side portions 76 and 78. This is shown joined to a collar or tube 80, if desired for geometry considerations and/or for ease of processing, in the area of end fitting 82. End fitting 82 is comprised of upper and lower halves 84 and 86 held together by bolts 88 and 91 to confine the loops 74 and the collar 80 (if used) integrated therewith within a cavity 90. In this drag brace construction a web 92 is provided, which may or may not have lightening holes 94. The webs are affixed, as by bonding, along their sides to the parallel side portions 76 and 78 of the loop.

Having described a manner of construction of this invention it is now desired to set forth the protection sought by these Letters Patent in the appended claims.

We claim:

1. A landing gear for an aircraft having a telescoping shock absorber whose elements are connected by a scissors link construction, which construction includes torque arm means a portion of which at least is characterized by the improvement of a composite of members comprising:
   a first loop of adhesively integrated filaments having rounded ends joined by non-overlapping parallel side portions;
   a second loop of adhesively integrated filaments having rounded ends joined by non-overlapping parallel side portions;
   a first end fitting means joining one rounded end of said first loop with one rounded end of said second loop; and
   a second end fitting means joining another rounded end of said first loop with another rounded end of said second loop.

2. The structure of claim 1 wherein said first end fitting means includes bushings formed of upper and lower halves defining a cavity upon being joined for said one rounded end of said first loop and said second loop.

3. The structure of claim 2 wherein said cavity is at an angle to the plane of said bushings.

4. The structure of claim 3 wherein said second end fitting means includes a two-part fitting having a cavity formed at one end by flanges diverging from the interior of the fitting towards the first loop and second loop on an angle corresponding to the angle of the cavity of the first end fitting means.

5. The structure of claim 1 wherein said first end fitting means spaces said first loop from said second loop and said second end fitting means arranges said first loop adjacent said second loop.

6. The structure of claim 1 wherein said first loop and said second loop converge from said first end fitting to said second end fitting.

7. The structure of claim 1 and further comprising a frame stiffener affixed to said first loop and said second loop.

8. The structure of claim 1 and further comprising tubular means integrated to said first loop and to said second loop at said rounded ends providing multi-directional load carrying ability to said composite.

References Cited

UNITED STATES PATENTS

| | | | |
|---|---|---|---|
| 3,279,278 | 10/1966 | Eldred | 74—579 |
| 3,370,483 | 2/1968 | Ditlinger | 74—579 |
| 3,388,615 | 6/1968 | Ditlinger | 74—579 |

FOREIGN PATENTS 599,722  11/1959  Italy.

MILTON BUCHLER, Primary Examiner

P. E. SAUBERER, Assistant Examiner

U.S. Cl. X.R.

74—579; 188—1